US 7,013,240 B2

(12) United States Patent
Malik et al.

(10) Patent No.: US 7,013,240 B2
(45) Date of Patent: Mar. 14, 2006

(54) METHOD TO SNAPSHOT AND PLAYBACK RAW DATA IN AN ULTRASONIC METER

(75) Inventors: Vipin Malik, Houston, TX (US); Gail Murray, Tomball, TX (US); Abhishek Bhatt, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 41 days.

(21) Appl. No.: 10/657,384

(22) Filed: Sep. 8, 2003

(65) Prior Publication Data
US 2005/0055177 A1    Mar. 10, 2005

(51) Int. Cl.
G06F 11/30 (2006.01)
G06F 15/00 (2006.01)
G21C 17/00 (2006.01)

(52) U.S. Cl. .................................... 702/183
(58) Field of Classification Search .............. 702/45, 702/48–50, 54, 100, 182–184, 189; 73/861.23, 73/861.27
See application file for complete search history.

(56) References Cited

U.S. PATENT DOCUMENTS 4,240,292 A * 12/1980 Zalessky et al. ......... 73/861.27
4,646,575 A    3/1987 O'Hair et al. ............ 73/861.31

* cited by examiner

Primary Examiner—Michael Nghiem
(74) Attorney, Agent, or Firm—Conley Rose, P.C.

(57) ABSTRACT

A system and method is configured to take a "snapshot" of data received by a meter or measurement device so that it may be later frozen or duplicated in a manner identical to that of the meter. The system includes recording a continuous stream of raw data into a format suitable for transport to a site better suited for debug and diagnosis, and replaying the data on a replay device such that time, as seen by the system, may be "frozen" at will and any instant of the stream examined.

31 Claims, 2 Drawing Sheets

METHOD TO SNAPSHOT AND PLAYBACK RAW DATA IN AN ULTRASONIC METER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to diagnosis of problems with measurements from a measurement device. More specifically, the invention relates to a method for the diagnosis of measurements from measurement devices that have a relatively high data input rate and a relatively low data output rate.

Quite often, a physical property, characteristic, or phenomenon requires measurement. Various meters and measurement devices have been developed in a wide variety of industries to measure a characteristic-of-interest. For example, a person may wish to measure characteristics of the atmosphere, a fluid flow, or a moving object. Measurement devices to monitor fluid flow include ultrasonic meters, coreolis meters, magnetic flow meters, turbine meters, and orifice plates.

Measurement devices are not perfect, however. They are known to make errors in measurements, there being many reasons why measurement devices may not measure a characteristic-of-interest accurately. Furthermore, diagnosing problems with measurement devices in the field can be a difficult and troublesome experience. This is particularly true if a large amount of data (i.e. a high input data rate) is being processed into a small amount of data (i.e. a low output data rate but with a high value content). The problem is exacerbated when input data varies considerably from one field location to another, resulting in no single or small data set being representative for typical conditions in the field.

An ultrasonic meter provides a good example of a measurement device with a high input data rate and a low output data rate, where measurement data varies from one location to another.

An ultrasonic meter, such as disclosed in U.S. Pat. No. 4,646,575, hereby incorporated by reference for all purposes, can have a 100-fold or more reduction in quantity between input data and output data. For example, an ultrasonic meter typically has a spoolpiece through which there is a fluid flow. Along the perimeter of the spoolpiece are one or more sets of transducers that act as transceivers, each transducer generating an ultrasonic signal and then receiving an ultrasonic signal from the respective transducer in the transducer pair. This may happen thousands of times per minute. Transit times are thus measured along each chord (i.e. ultrasonic wave path) for the upstream and downstream ultrasonic signals. The difference in travel times between upstream and downstream ultrasonic signals indicates the velocity of the fluid flow within the pipeline.

The ultrasonic meter also includes electronics that sample and record pertinent ultrasonic signal information. Each ultrasonic signal generated by a transducer (either upstream or downstream) is identified by numerous pieces of information when sampled and recorded. These include a wavenumber, path identifier ($A_{up}$, $A_{dwn}$, $B_{up}$, $B_{dwn}$, etc.), gain (AGC), hold number (delay from generation of the ultrasonic signal until the time at which the data is recorded, indicating a window during which the ultrasonic signal is expected to arrive), and a value for each of, e.g., 256 samples in the received waveform. The sample rate must also be known.

To determine transit time accurately, a batch of e.g., 20 ultrasonic signals along the same chord and same direction are taken and then processed to provide velocity and speed of sound for each chord. Thus, in this example, over ten thousand pieces of information for each chord are transformed into two: velocity and speed of sound for each chord. This information may then be averaged to compute average velocity and speed of sound for the fluid passing through the spoolpiece. This is an example of a high data input and low data output.

Unfortunately, measurement errors occur. In the case of an ultrasonic meter, one or more of the measurements may deviate so significantly from a benchmark that it indicates a problem either with the fluid flow or with the meter itself. Typically, it will be difficult to diagnose the problem based on only the velocity and speed of sound measurements. Similarly, it may be difficult to determine based only on velocity and speed of sound measurements whether there exists a measurement error or whether an unusual or notable event is occurring in the medium being measured by the measurement device.

A technician may be dispatched to the site of the measurement device to analyze the apparent problem based on the greater amount of data available at the meter location. One approach to investigating the apparent problem includes recording the raw data, partially calculated values, or final answers at predetermined moments in time. This may be referred to as inserting "measurement points" into the data sampling. Examination of the recorded data is then made and an attempt made to identify the problem. One problem with such an approach, however, is its failure to collect data in between the temporal measurement points. As a result, a substantial amount of data is not collected. If a cause or condition of a meter problem takes place while data is not being recorded, detection of the cause or condition can be missed.

Alternately, an in-circuit emulator at the meter location may be used to try and identify the apparent problem. An in-circuit emulator is a device separate from the measurement device or a programmed feature in the measurement device electronics that waits for a trigger condition (such as an unusually high maximum transit time). Upon occurrence of the trigger condition, the in-circuit emulator triggers a secondary effect—it either records data corresponding to that instant in time or stops program execution. This recorded data or program memory is then examined in an effort to identify the problem. A problem with this approach, however, is that it does not collect data prior to the trigger event. This is a problem when the trigger event is only a culmination of a trend or ongoing problem in existence before the trigger event. In such a case, it may be difficult to identify the problem by use of an in-circuit simulator.

A drawback with both of these approaches is that they rely greatly on the knowledge and training of the technical persons who are sent to investigate the problem at the meter location. There is little opportunity to carefully diagnose the problem elsewhere because much of the analysis and effort to rectify a problem takes place at the meter location.

Both of these approaches record only limited data, either at the time of an event or at spaced intervals. This is a problem because a more complete set of data is important when attempting to identify a problem with the measurement device. A problem with the measurement of fluid flow may correlate to any one of a number of different issues. A peak selection error may be due to noise, turbulence in the fluid flow, or incorrect default values in the meter's software. However, because of the high amount of data that is processed or refined down in a high input-low output processing scheme, crucial information may go unreported or underreported, leading to an inability to adequately describe fleeting anomalous conditions. If these fleeting conditions are not captured by the method used to identify a problem with the measurement device, they go undetected.

SUMMARY OF THE INVENTION

One embodiment of the invention is a method for analyzing data measurement, including programming the measurement device with a predetermined trigger value corresponding to a characteristic of interest, recording a first set of data by the measurement device that occurs prior to an occurrence for the trigger value, recording a second set of data by the measurement device that occurs at the time of the occurrence for the trigger value, and playing the first and second sets of data on a simulator at a time after the occurrence of the predetermined trigger value. The data includes temporal information and the method may also include recording and playing a third set of data collected after occurrence of the third trigger value in the characteristic of interest.

A second embodiment of the invention is a method for analyzing measurement device performance, including recording an uninterrupted stream of data from a measurement device to a first location, the duration of the uninterrupted stream of data being of a substantially longer duration than fluctuations in the characteristic of interest, retrieving the stream of data from the first location, and playing the uninterrupted stream of the data on a replay device.

A third embodiment of the invention is a measurement device diagnostic system including a measurement device for taking measurements of a characteristic of interest, a processor not located in the measurement device, means to record data corresponding to the measurements to a memory device, and means to transmit the data from the memory device to the processor. The measurement device may be an ultrasonic meter.

A fourth embodiment of the invention is a method for analyzing measurement data from a measurement device including producing measurement data at a data acquisition rate, producing output data from the measurement data at an output data rate (where the output data rate is lower than the measurement data acquisition rate), reordering the measurement data, transmitting temporal data corresponding to the measurement data along with the measurement device to a location outside the measurement device, and playing the measurement data on a reply device.

Thus, the present invention comprises a combination of features and advantages which enable it to overcome various problems of prior devices. The various characteristics described above, as sell as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

The novel solution of the invention is a system and method to take a "snapshot" of meter performance. This includes: 1) recording a continuous stream of raw data into a format suitable for transport to a site better suited for debug and diagnosis; and 2) replaying the data on a replay device such that time, as seen by the system, may be "frozen" at will and any instant of the stream examined.

Figure 1A:
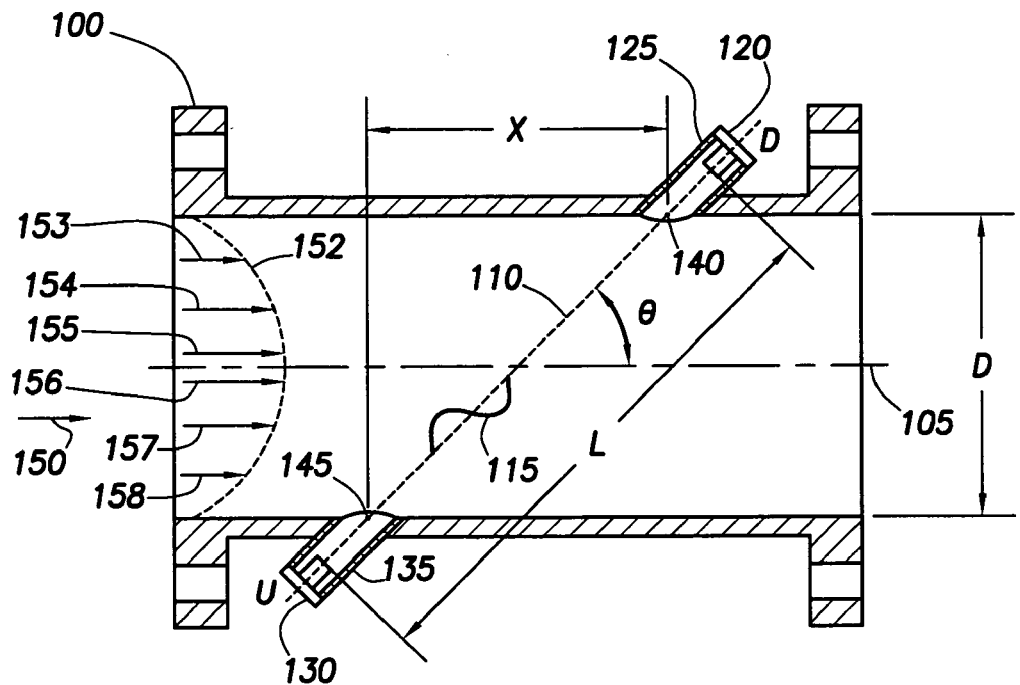
FIG. 1A is a cut-away top view of an ultrasonic gas flow meter.

FIG. 1A shows one type of ultrasonic meter suitable for measuring gas flow. Spoolpiece 100, suitable for placement between sections of gas pipeline, has a predetermined size and thus defines a measurement section. Alternately, a meter may be designed to attach to a pipeline section by, for example, hot tapping. As used herein, the term "pipeline" when used in reference to an ultrasonic meter may be referring also to the spoolpiece or other appropriate housing across which ultrasonic signals are being sent. A pair of transducers 120 and 130, and their respective housings 125 and 135, are located along the length of spoolpiece 100. A path 110, sometimes referred to as a "chord" exists between transducers 120 and 130 at an angle $\theta$ to a centerline 105. The position of transducers 120 and 130 may be defined by this angle, or may be defined by a first length L measured between transducers 120 and 130, a second length X corresponding to the axial distance between points 140 and 145, and a third length D corresponding to the pipe diameter. Distances D, X and L are precisely determined during meter fabrication. Points 140 and 145 define the locations where acoustic signals generated by transducers 120 and 130 enter and leave gas flowing through the spoolpiece 100 (i.e. the entrance to the spoolpiece bore). In most instances, meter transducers such as 120 and 130 are placed a specific distance from points 140 and 145, respectively, regardless of meter size (i.e. spoolpiece size). A fluid, typically natural gas, flows in a direction 150 with a velocity profile 152. Velocity vectors 153–158 indicate that the gas velocity through spool piece 100 increases as centerline 105 of spoolpiece 100 is approached.

Transducers 120 and 130 are ultrasonic transceivers, meaning that they both generate and receive ultrasonic signals. "Ultrasonic" in this context refers to frequencies above about 20 kilohertz as required by the application. Typically, these signals are generated and received by a piezoelectric element in each transducer. To generate an ultrasonic signal, the piezoelectric element is stimulated electrically, and it responds by vibrating. This vibration of the piezoelectric element generates an ultrasonic signal that travels across the spoolpiece to a corresponding transducer of the transducer pair. Similarly, upon being struck by an ultrasonic signal, the receiving piezoelectric element vibrates and generates an electrical signal that is detected, digitized, and analyzed by electronics associated with the meter. It is these electronics (and software) that process the sampled data to yield output data.

Initially, D ("downstream") transducer 120 generates an ultrasonic signal that is then received at, and detected by, U ("upstream") transducer 130. Some time later, U transducer 130 generates a return ultrasonic signal that is subsequently received at and detected by D transducer 120. Thus, U and D transducers 130 and 120 play "pitch and catch" with ultrasonic signals 115 along chordal path 110. During operation, this sequence may occur thousands of times per minute.

The transit time of the ultrasonic wave 115 between transducers U 130 and D 120 depends in part upon whether the ultrasonic signal 115 is traveling upstream or downstream with respect to the flowing gas. The transit time for an ultrasonic signal traveling downstream (i.e. in the same direction as the flow) is less than its transit time when traveling upstream (i.e. against the flow). In particular, the transit time $t_1$, of an ultrasonic signal traveling against the fluid flow and the transit time $t_2$ of an ultrasonic signal travelling with the fluid flow is generally accepted as being defined as:

$$t_1 = \frac{L}{c - V\frac{x}{L}} \quad (1)$$

$$t_2 = \frac{L}{c + V\frac{x}{L}} \quad (2)$$

where,
- c=speed of sound in the fluid flow;
- V=average axial velocity of the fluid flow over the chordal path in the axial direction;
- L=acoustic path length;
- x=axial component of L within the meter bore;
- $t_1$=transmit time of the ultrasonic signal against the fluid flow; and
- $t_2$=transit time of the ultrasonic signal with the fluid flow.

The upstream and downstream transit times are typically calculated separately on an average of a batch of measurements, such as 20. These upstream and downstream transit times may then be used to calculate the average velocity along the signal path by the equation:

$$V = \frac{L^2}{2x} \frac{t_1 - t_2}{t_1 t_2} \quad (3)$$

with the variables being defined as above.

The upstream and downstream travel times may also be used to calculate the speed of sound in the fluid flow according to the equation:

$$c = \frac{L}{2} \frac{t_1 + t_2}{t_1 t_2} \quad (4)$$

To a close approximation, equation (3) may be restated as:

$$V = \frac{c^2 \Delta t}{2x} \quad (5)$$

where, $$\Delta t = t_1 - t_2 \quad (6)$$

So to a close approximation at low velocities, the velocity v is directly proportional to Δt.

Given the cross-section measurements of the meter carrying the gas, the average velocity over the area of the meter bore may be used to find the volume of gas flowing through the meter or pipeline 100.

In addition, ultrasonic gas flow meters can have one or more paths. Single-path meters typically include a pair of transducers that projects ultrasonic waves over a single path across the axis (i.e. center) of spoolpiece 100. In addition to the advantages provided by single-path ultrasonic meters, ultrasonic meters having more than one path have other advantages. These advantages make multi-path ultrasonic meters desirable for custody transfer applications where accuracy, repeatability, and reliability are crucial.

Figure 1B:
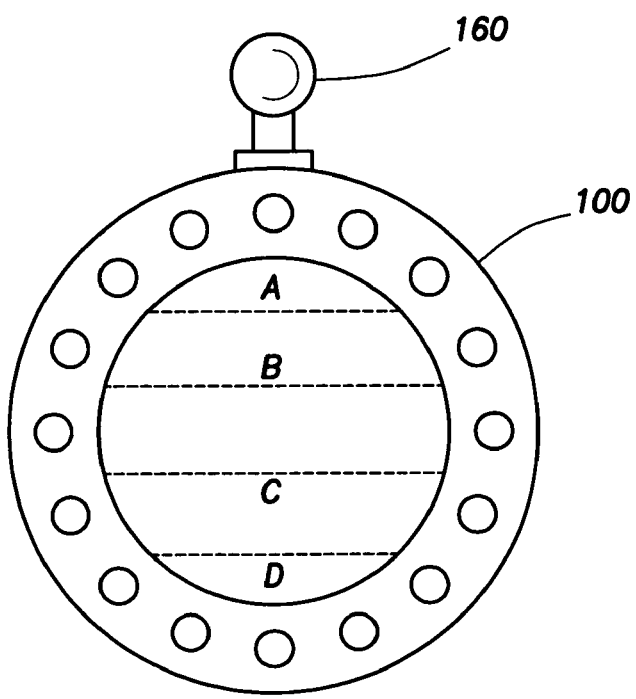
FIG. 1B is an end view of a spoolpiece including chordal paths A–D.

Referring now to FIG. 1B, a multi-path ultrasonic meter is shown. Spool piece 100 includes four chordal paths A, B, C, and D at varying levels through the gas flow. Each chordal path A–D corresponds to two transceivers behaving alternately as a transmitter and receiver. Also shown is an electronics module 160, which acquires and processes the data from the four chordal paths A–D. This arrangement is described in U.S. Pat. No. 4,646,575, the teachings of which are hereby incorporated by reference. Hidden from view in FIG. 1B are the four pairs of transducers that correspond to chordal paths A–D.

Figure 1C:
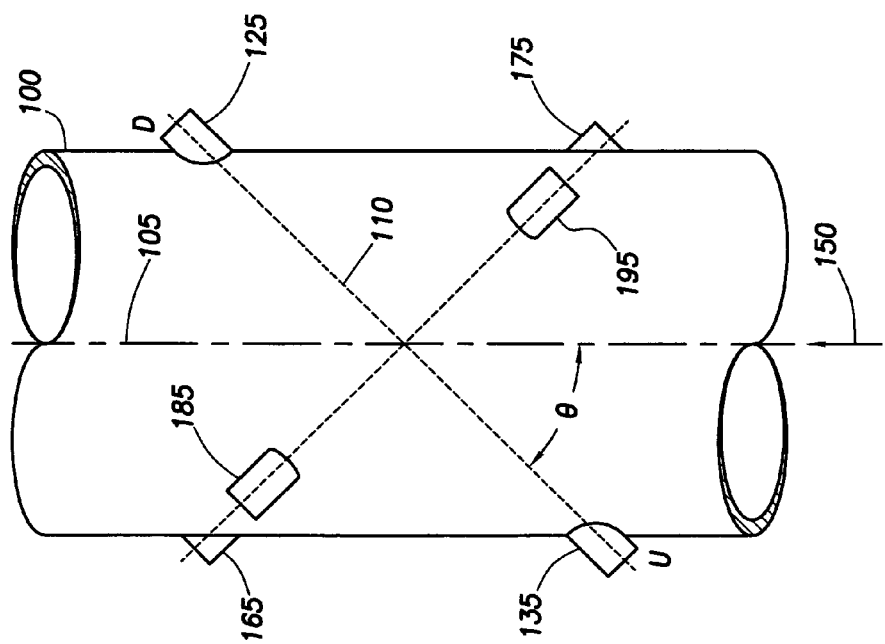
FIG. 1C is a top view of a spoolpiece housing transducer pairs.

The precise arrangement of the four pairs of transducers may be more easily understood by reference to FIG. 1C. Four pairs of transducer ports are mounted on spool piece 100. Each of these pairs of transducer ports corresponds to a single chordal path of FIG. 1B. A first pair of transducer ports 125 and 135 includes transducers 120 and 130 recessed slightly from the spool piece 100. The transducers are mounted at a non-perpendicular angle θ to centerline 105 of spool piece 100. Another pair of transducer ports 165 and 175 including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level" (i.e. a different radial position in the pipe or meter spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an X and the lower two pairs of transducers corresponding to chords C and D also form an X.

Referring now to FIG. 1B, the flow velocity of the gas may be determined at each chord A–D to obtain chordal flow velocities. To obtain an average flow velocity over the entire pipe, the chordal flow velocities are multiplied by a set of predetermined constants. Such constants are well known and were determined theoretically.

Thus, transit time ultrasonic flow meters measure the times it takes ultrasonic signals to travel in upstream and downstream directions between two transducers. This information, along with elements of the geometry of the meter, allows the calculation of both the average fluid velocity and the speed of sound of the fluid for that path. In multipath meters the results of each path are combined to give an average velocity and an average speed of sound for the fluid in the meter. The average velocity is multiplied by the cross sectional area of the meter to calculate the actual volume flow rate.

Figure 2:
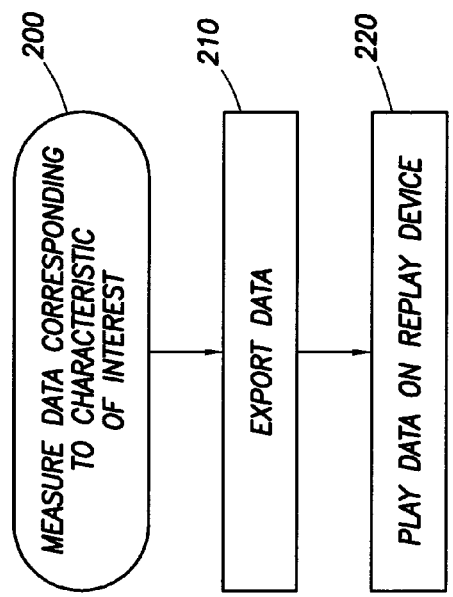
FIG. 2 is a flow chart of a method according to the invention.

Referring to FIG. 2, a method according to the invention is shown. A measurement device measures raw data corresponding to a characteristic of interest at step 200. It is to be understood that the term "raw data" includes data prior to final processing that undergoes additional processing. "Raw data" refers most broadly to any data prior to final processing. It is to be understood that a high data input-low data output measurement device includes a routine to process the raw data into output data. Such a routine includes a number of steps, and may be programmed in the device as a single processing software chain. This routine would normally be stored in firmware in the ROM or PROM in electronics associated with the measurement device.

At step 210, the measurement device exports the raw data. Exporting the data means to send it from one program or computer system to another program or computer system. In this case, raw data should be exported, as it is sampled, from an embedded (computer) system to a portable computer so that the data may be stored (such as on a hard drive) for further analysis. To export input data that corresponds to each waveform, a feature or routine in the original signal processing software chain should be included to export the input data as it is arriving at the start of the chain. The data may be exported at all times into a circular buffer (either on the hard disk of an external computer or within the measurement device itself). Any number of trigger conditions may be programmed or pre-programmed into the software that would cause the recording device to "save off" the older data and continue to record new data. For example, it may be done manually or automatically. Either way, the data recorded earlier in time than the detected trigger condition would not be written over. Data available for later analysis would include an uninterrupted stream including data recorded before the trigger condition, the data recorded at the time of the trigger condition, and the data recorded after the trigger condition.

Also included with the exported data may be any other information such as gain or other physical parameters that were used to collect the data Temporal data indicating when each sample of the ultrasonic waveform was taken should also be included. Adequate temporal information could constitute timestamps corresponding to the moment at which each group of data was received or collected.

The inclusion of temporal data with the exported data is a particularly notable aspect of the invention. Identification of meter or measurement device behavior is most effective when a detailed recording of the measurement data has been made so that even small perturbations can be detected and identified. To achieve the desired level of detail, it is important that the relative timing for all the data is precise. Temporal data such as timestamps provides this precision among the many ultrasonic signals that are sampled and recorded.

Temporal data combined with the input data results in a stream of data that is in a form suitable to save to a hard drive or other appropriate device. The stream of data may alternately be transmitted to a remote location, either along a cable or wirelessly. If desired, prior to save or transmission the data may be compressed by well known data-compression techniques but the data should be fully reproducible at the site of diagnosis and debug. Enough information should be transmitted to allow the characteristic-of-interest to be reproduced deterministically. This allows a full analysis of the data to be run. At a minimum, a large percentage of the data should be retrievable, so that to the extent possible the problem may be identified.

A second aspect to the invention is replaying the exported data at a remote location or later in time, occurring at step 220. A replay device according to the invention allows recorded data to be fed to signal processing software in the same manner as was being done by signal processing software at the field location. The replay device may then replay (i.e., process) raw data in the same manner as it was originally received by the signal processing chain at the field location. For example, the data measured by the measurement device (e.g. an ultrasonic meter) may be played on a simulator that yields a set of output data that substantially reproduces the characteristic of interest recorded at the field location. The set of output data from the simulator is substantially the same as that from the measurement device for the characteristic of interest.

The term "substantially" in this context means that the output data is the same with respect to the characteristic or characteristics of interest that is or are being measured to such an extent the characteristic of interest can be reproduced. Ultimately, this means that the data must be similar enough to detect the same problem or interesting phenomenon that caused the measurement data to be of interest initially.

A laptop or portable computer may be used as a replay device. In the case of a laptop computer, client software installed on the laptop would receive the digitized data over a communication link. The laptop computer would save this data to, e.g., a file on the hard drive. Software installed on the laptop would operate as a software simulator, capable of reading the saved file and playing it back on demand at a later date or a different place.

The playback parameters would depend on any number of desired and important criteria that would be specific to the system. The most important feature of the playback system would be to present the data intended for play back to the signal processing chain in such a manner that the signal processing chain in the simulator would behave in a substantially identical manner to the signal processing chain in the field (where the data was originally exported). Additionally, the data would be played back in a manner (utilizing the stored parameters that were stored along with the raw data) so as to reproduce the detected conditions and characteristic(s)-of-interest, and hence the issue, that was desired to be "snapshot" at the field site.

The replay portion of the invention allows time, as seen by the system, to be frozen at will and any part of the raw and any other pertinent data examined. The input data may then be replayed back one sample at a time or at any desired rate to enable adequate debugging of the original problem.

Because the data is already recorded, and the corresponding output has already been calculated, new (including modified) software for a data processing chain can be tested. Calculations are executed on the data and by the results of those calculations are compare to known correct results to determine if there is any error in the new software. This will also help detect viruses that corrupt software.

The snapshot-and-playback feature will be immensely useful to detect anomalous conditions that cause a measurement error. Additionally, this feature can be used extensively to further the capabilities of the software processing chain to handle new flow conditions. These tests can be made in the laboratory.

For example, signal processing software implements a set of algorithms. Each algorithm has been derived/determined to work on a certain set of data. There are inherent assumptions to the data that reflects a set of flow conditions. These assumptions are or were based on the original set(s) of data that were examined to determine the algorithms originally (when the product was designed). Any flow conditions that adhere to these assumptions will be measured properly. Any physical changes in the flow conditions that invalidate the original assumptions will lead to an erroneous measurement in the field. A new set of data (corresponding to these new flow conditions) can be snapshot and then examined in the lab at a later date to see how the signal processing software may be modified to suitable process this new flow condition(s).

An example is noise introduced by flow valves. Current software for an ultrasonic meter of the assignee may assume that the signal-to-noise ratio in a measured signal is below a certain value (such as 30 (signal strength) to 1 (noise level)). A field condition may be encountered where noise is particularly bad and there is only a 10 to 1 signal-to-noise ratio. The raw data could be snap shot (exported and recorded), brought back to a lab, analyzed (e.g. using FFT (Fast Fourier Transforms) spectrum analysis) and a new digital filter developed that reduces noise levels. The flow could then be accurately measured even in such adverse conditions. This way new flow conditions can be handled by utilizing the snapshot and playback feature of the system.

An additional benefit of this feature is that since the data is being "played back" from a deterministic source, it is extremely repeatable. Thus the data can be used for "what if" scenarios where software processing chain changes are compared with the same data set run through both processors and the results compared. This also makes the replay aspect of the invention a good training tool.

Another advantage of the invention is an ability to control the snapshot feature remotely; there is no need to dispatch a technician to the meter location. Another aspect of the invention is that the snapshot feature may be triggered either manually (such as by a switch on the measurement device or a switch remote from the measurement device) or automatically (such as when an event occurs that exceeds a predetermined threshold).

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for analyzing a measurement, comprising:
    a) programming a measurement device with a predetermined trigger value corresponding to a characteristic of interest detected by said measurement device;
    b) recording a first set of data by said measurement device to a first location;
    c) recording a second set of data by said measurement device to a second location, wherein said second set of data corresponds to a time of occurrence for said trigger value and said first set of data corresponds to a time prior to said occurrence;
    d) playing said first and second sets of data at a time after said occurrence on a simulator of said measurement device, said simulator suitable to operate on said first and second sets of data to produce simulator output data, said output data being smaller than said first and second sets of data.

2. The method of claim 1, said first set of data including first set of data including first temporal information and said second set of data including second temporal information.

3. The method of claim 1, further comprising:
    e) recording a third set of data by said measurement devise to a third location, wherein said third set of data corresponds to a timer after said occurrence;
    f) playing said third set of data on said simulator.

4. The method of claim 3, said first set of data including first temporal information, said second set of data including second temporal information, and said third set of data including third temporal information.

5. The method of claim 1, wherein said measurement device provides measurement device output data, said simulator output data being identical to said measurement device output data.

6. The method of claim 1, said measurement device being an ultrasonic flow meter.

7. The method of claim 1, wherein said characteristic of interest is time of flight for an ultrasonic signal.

8. The method of claim 1, said playing step being conducted on a portable computer.

9. The method of claim 1, wherein said first and second locations are on a hard disk drive.

10. The method of claim 1, said simulator including a signal processing chain substantially similar to one located in said measurement device.

11. A method for analyzing a measurement device performance, comprising:
    a) recording an uninterrupted stream of data from said measurement device to a first location, said measurement device having a measurement portion to detect a characteristic of interest and generate said uninterrupted stream of data, said uninterrupted stream of data being of a substantially longer duration that fluctuations in said characteristic of interest;
    b) retrieving said stream of data from said first location; and
    c) playing said uninterrupted stream of said data on a replay device, said replay device suitable to process said stream of data in a substantially similar manner as electronics associated with said measurement device.

12. The method of claim 11, wherein said characteristic-of-interest does not satisfy a pre-set trigger, preset trigger condition at a second time, said uninterrupted stream of data being from said first time through some time after said second time.

13. The method of claim 11, wherein said measurement device is an ultrasonic meter.

14. The method of claim 11, wherein said first location is a hard disc drive.

15. The method of claim 11, wherein said replay device is a portable computer.

16. The method of claim 11 further comprising:
    d) stopping said playing of said uninterrupted stream of data in order to analyze data from a single instant in time.

17. The method of claim 11, wherein the duration of said uninterrupted stream of data is at least greater than one hour.

18. The method of claim 11, wherein the duration of said uninterrupted stream of data is several minutes.

19. The method of claim 11, wherein said reply device processes said uninterrupted stream of data in substantially identical manner as said electronics.

20. The method of claim 11, wherein said step of playing occurs at a time later than said recording and at a location other than said measurement device.

21. The method of claim 11, further comprising transmitting said uninterrupted stream of data wirelessly prior to said step of recording.

22. A method for analyzing measurement data from a measurement device, comprising:
   a) measuring a characteristic-of-interest in a medium by a measurement device to produce measurement data at a measurement data acquisition rate;
   b) producing output data at an output data rate from said measurement device, said output data being based on said measurement data, wherein said output data rate is lower than said measurement data acquisition rate;
   c) recording said measurement data from said measurement device to a first location;
   d) transmitting temporal data corresponding to said measurement data along with said measurement data from said first location to a second location, said second location being outside of said measurement device; and
   e) playing said measurement data from said second location on a simulator, said simulator being outside said measurement device, said simulator being programmed to provide a set of output data that substantially reproduces the characteristic-of-interest recorded at said first location.

23. The method of claim 22, wherein said step of recording begins by a manual actuation.

24. The method of claim 23, wherein said manual actuation includes a switch on said measurement device.

25. The method of claim 22, wherein said step of recording begins by an automatic response by said measurement device to a condition.

26. The method of claim 22, wherein said temporal data are timestamps.

27. The method of claim 22, said method being deterministic.

28. The method of claim 22, said measurement device being an ultrasonic flow meter.

29. The method of claim 22, said simulator being programmed to include a signal processing chain the same as one programmed in said measurement device.

30. The method of claim 22, said output data from said simulator being the same as said output data from said measurement device with respect to said characteristic of interest.

31. The method of claim 22, said output data from said simulator being identical to said output data from said measurement device.

* * * * *